United States Patent
Takahashi et al.

(10) Patent No.: US 9,521,417 B2
(45) Date of Patent: Dec. 13, 2016

(54) VIDEO ENCODING DEVICE USING PREDICTED MOTION VECTOR FOR BLOCKS OF DIFFERENT SIZE

(71) Applicant: Hitachi Kokusai Electric Inc., Tokyo (JP)

(72) Inventors: Masashi Takahashi, Tokyo (JP); Nobuhiro Chihara, Tokyo (JP); Muneaki Yamaguchi, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 211 days.

(21) Appl. No.: 14/354,322

(22) PCT Filed: Oct. 23, 2012

(86) PCT No.: PCT/JP2012/077331
§ 371 (c)(1),
(2) Date: Apr. 25, 2014

(87) PCT Pub. No.: WO2013/065524
PCT Pub. Date: May 10, 2013

(65) Prior Publication Data
US 2014/0341294 A1    Nov. 20, 2014

(30) Foreign Application Priority Data

Nov. 1, 2011    (JP) .................. 2011-240445

(51) Int. Cl.
*H04N 19/134* (2014.01)
*H04N 19/56* (2014.01)
(Continued)

(52) U.S. Cl.
CPC .......... *H04N 19/134* (2014.11); *H04N 19/119* (2014.11); *H04N 19/139* (2014.11);
(Continued)

(58) Field of Classification Search
CPC .................................... H04N 19/134
See application file for complete search history.

(56) References Cited

U.S. PATENT DOCUMENTS

| | | | |
|---|---|---|---|
| 6,212,237 B1 * | 4/2001 | Minami | H04N 5/145 348/E5.066 |
| 9,445,121 B2 * | 9/2016 | Tourapis | H04N 19/583 |

(Continued)

FOREIGN PATENT DOCUMENTS

| | | |
|---|---|---|
| JP | 2000253407 A | 9/2000 |
| JP | 2005-101811 A | 4/2005 |

(Continued)

OTHER PUBLICATIONS

International Search Report issued in corresponding application No. PCT/JP2012/077331 on Feb. 5, 2013.
(Continued)

*Primary Examiner* — James Pontius
(74) *Attorney, Agent, or Firm* — Brundidge & Stanger, P.C.

(57) ABSTRACT

An image encoding device that appropriately estimates a prediction vector by avoiding an uncoded macro block (MB) is disclosed. The device determines a start point of searching a motion vector for an encoding target region, from the prediction vector for the target region which is determined with motion vectors for surrounding blocks around the target region and in accordance with a predetermined rule, and starts searching for the motion vector from the search start point. If the size of the encoding target region cannot be acquired during calculation of the prediction vector, the device determines the size of the encoding target region, from the size of an encoded region other than the target region. If at least one of the motion vectors for the surrounding blocks cannot be acquired, the device calculates the prediction vector using alternatively a motion vector of an encoded block outside of the target region.

7 Claims, 10 Drawing Sheets

(51) Int. Cl.
*H04N 19/176* (2014.01)
*H04N 19/119* (2014.01)
*H04N 19/513* (2014.01)
*H04N 19/139* (2014.01)

(52) U.S. Cl.
CPC ......... *H04N 19/176* (2014.11); *H04N 19/513* (2014.11); *H04N 19/56* (2014.11)

(56) References Cited

U.S. PATENT DOCUMENTS

2005/0063468 A1   3/2005   Shimizu et al.
2008/0267292 A1   10/2008  Ito et al.

FOREIGN PATENT DOCUMENTS

| JP | 2006074520 A | 3/2006 |
| JP | 2007166545 A | 6/2007 |
| JP | 2008-154072 A | 7/2008 |
| JP | 2008-278091 A | 11/2008 |
| JP | 2009-055254 A | 3/2009 |

OTHER PUBLICATIONS

International Publication issued in corresponding application No. PCT/JP2012/077331 on May 10, 2013.
JPO Foreign Office Action dated Sep. 11, 2015.

\* cited by examiner

PREDICTION VECTOR PMV = median($MV_A$, $MV_B$, $MV_C$)

*NOTE THAT IF $MV_C$ CANNOT BE USED,
 $MV_D$ IS USED INSTEAD.

(1) WHEN $ACT_{MV} = \sum_{k \in (a, b, c)} |MV_k - \text{average}(MV_a, MV_b, MV_c)| < \text{THRESHOLD}$, $PMV_{MV1} = \text{median}(MV_a, MV_b, MV_c)$ (2) WITH EXCEPTION OF (1), $PMV_{MV1} = \text{median}(MV_b, MV_c, MV_d)$

VIDEO ENCODING DEVICE USING PREDICTED MOTION VECTOR FOR BLOCKS OF DIFFERENT SIZE

BACKGROUND

Technical Field

The present invention relates to an image encoding device that encodes images.

Related Art

Encoding schemes, such as the Moving Picture Experts Group (MPEG) scheme, have developed as a technique for digitizing large volumes of moving image information and recording or transmitting it. The MPEG-1, MPEG-2, MPEG-4 and H.264/Advanced Video Coding (AVC) specifications, and the like have been employed as international standard encoding schemes. These schemes have been applied to digital satellite broadcast systems, Digital Versatile Discs (DVDs), portable phones, digital cameras, and the like. Currently, au utilization range of the schemes is increasingly expanding, and they have accordingly become familiar.

In the specifications above, an encoding target image (also referred to below as simply a "target image"), which is an image to be encoded, is predicted in blocks with image information (referred to below as a "decoded image" or "reference image") that has undergone an encoding process. Subsequently, a difference (referred to below as "predicted difference" as appropriate) between the target image and the original image is encoded. In this way, these specifications reduce the amount of code data by eliminating redundancy of moving images. In particular, an inter prediction (also referred to as an inter-frame prediction or inter-screen prediction), which refers to a decoded image that differs from the target image, achieves a highly accurate prediction by designating a block (referred to below as a "reference block") in the reference image (decoded image) which has a strong correlation with an encoding target block (referred to below as a "target block") in the target image. In addition, a motion vector that represents a difference in coordinates between the target block and the reference block is also encoded, independently of the predicted difference.

In encoding a motion vector, a motion vector (referred to below as a "prediction vector") for a target block is predicted from motion vectors for blocks positioned around the target block. Subsequently, a difference between the motion vector and the prediction vector is encoded as the motion vector (e.g., JP 2008-278091 A). In this case, the amount of generated code may be heavily dependent on the prediction vector. Therefore, when a motion search process for searching a reference image for a block that has a strong correlation with a target block and a mode selecting process for determining an optimum prediction method (intra or inter prediction) are performed, the amount of generated code to be generated may be estimated by referring to the above difference. Furthermore, in order to increase the accuracy of the motion search, a search start point may be determined with the prediction vectors for the surrounding blocks.

On the other hand, currently, dedicated LSIs for image processing which conform to standard specifications such as the H.264/AVC are being developed (e.g., "Standard technology (layout of system LSI) database: image processing LSI/data compressing LSI," [online], JPO, [Search date: Oct. 11, 2011], Internet <URL: http://www.jpo.go.jp/shiryou/toushin/chousa/0007.html>).

SUMMARY

In order to calculate a prediction vector in conformity with a certain standard specification, information regarding the block size of a target block, the size of blocks (surrounding blocks) positioned around the target block, and motion vectors for the surrounding blocks is necessary. However, if an encoding process is influenced by a pipeline processing performance, for example, because of an encoder implemented using a hardware technique of an LSI, encoding of the surrounding blocks may not yet be completed in the course of the encoding process for the target block. In this case, necessary information, such as the block size of surrounding blocks or motion blocks therefor, cannot be acquired. Moreover, for example, if the motion search is performed in small blocks and the block size of the target block is determined on the basis of this search result, in order to reduce the throughput, the size of the target block may not have been determined when the motion search is initiated.

In the cases above, it is not possible to refer to the prediction vector. This may create a problem in that accuracy of the motion search or mode selecting process is lowered and therefore efficiency of the encoding process is greatly deteriorated.

The present invention addresses the problem above with an object of providing an image encoding device, which is capable of avoiding reduction in accuracy of motion search and mode selecting processes by estimating appropriately various pieces of information required to calculate a prediction vector.

According to an aspect of the present invention that aims to address the problem above, there is provided an image encoding device which encodes an image by searching for a motion vector for an encoding target region that is a region in a target image to be encoded, and by subjecting the target image to an inter prediction, on the basis of the motion vector for the encoding target region. A motion search section determines a search start point of the motion vector for the encoding target region, from a prediction vector that is a motion vector determined in accordance with a preset rule, the prediction vector being a motion vector for the encoding target region to be predicted, the preset rule being defined in advance with motion vectors for surrounding blocks positioned around the encoding target region. The motion search section starts searching for the motion vector for the encoding target region from the search start point. When a size of the encoding target region cannot be acquired in calculating the prediction vector in accordance with the preset rule, a prediction vector estimating section determines the size of the encoding target region, from a size of an encoded region in the target image other than the encoding target region, thereby calculating the prediction vector. When at least one of the motion vectors for the surrounding blocks cannot be acquired, the prediction vector estimating section calculates the prediction vector, from a motion vector for an encoded region in the target image other than the encoding target region. A variable-length encoding section encodes a difference between the prediction vector and the motion vector for the encoding target region which the motion search section has searched for.

Even when it is impossible to acquire information required to calculate the prediction vector and therefore to refer to the prediction vector, the configuration above can calculate the prediction vector by appropriately estimating various pieces of information required to calculate the prediction vector. It is thus possible to avoid reduction in accuracy of motion search and mode selecting processes, and efficiency of an encoding process.

According to another aspect of the present invention, when the size of the encoding target region cannot be acquired, the prediction vector estimating section may determine the block size of the encoding target region by using information regarding sizes of the surrounding blocks, in accordance with the rule defined in advance.

Even when it is impossible to acquire the size of the encoding target region which is required to calculate the prediction vector and therefore to refer to the prediction vector, the configuration above can calculate the prediction vector by appropriately estimating various pieces of information required to calculate the prediction vector. It is thus possible to avoid reduction in accuracy of motion search and mode selecting processes. In addition, it is possible to avoid reduction in efficiency of an encoding process.

According to further another aspect of the present invention, when at least one of the motion vectors for the surrounding blocks cannot be acquired, the prediction vector estimating section may determine which of motion vectors for a plurality of encoded regions in the target image other than the encoding target region is used to calculate the prediction vector, on the basis of a variance value of the motion vectors for the plurality of encoded regions.

Even when it is impossible to acquire at least one of the motion vectors of the surround blocks which are required to calculate the prediction vector and therefore to refer to the prediction vector, the configuration above can calculate the prediction vector by appropriately estimating various pieces of information required to calculate the prediction vector. It is thus possible to avoid reduction in accuracy of motion search and mode selecting processes. In addition, it is possible to avoid reduction in efficiency of encoding process.

According to an aspect of the present invention, even when it is impossible to acquire information required to calculate a prediction vector and therefore to refer to the prediction vector, appropriate estimation of a various pieces of information required to calculate the prediction vector can estimate the prediction vector. It is thus possible to avoid reduction in accuracy of motion search and mode selecting processes.

DETAILED DESCRIPTION

Figure 1:
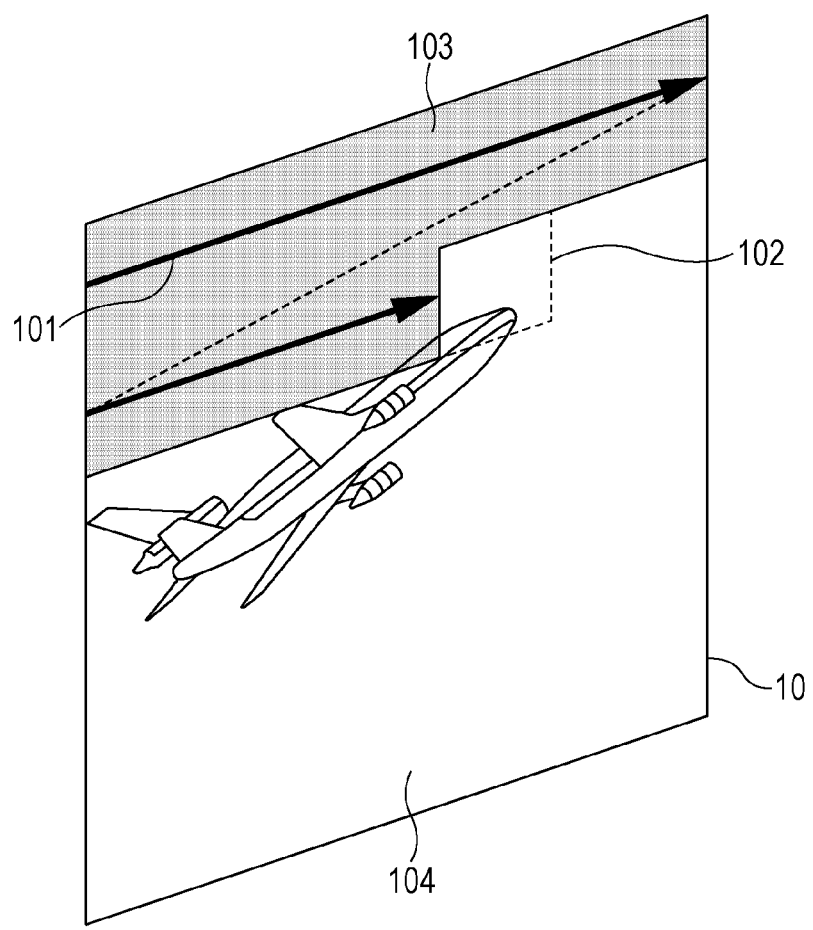
FIG. 1 conceptually shows an encoding process for a moving image with the H.264/AVC.

An embodiment of the present invention will be described below with reference to the drawings. In the drawings to be referred to in the following description, the same parts are denoted by the same reference characters. (Encoding process with H.264/AVC)

First, a detailed description will be given of an encoding process with the H.264/AVC and a problem with this process. In the H.264/AVC, an encoding target image, which is an image to be encoded, is estimated with a decoded image that has undergone an encoding process. Subsequently, a difference (predicted difference) between the encoding target image and the original image is encoded. In this way, the H.264/AVC decreases the amount of generated code by reducing redundancy of a moving image. Moreover, in the H.264/AVC, the prediction is performed in blocks, in order to utilize local properties of a moving image, each block being acquired by finely dividing an image.

As shown in FIG. 1, the encoding process is performed in macro blocks (MB) 102 in a target image 10 in order of a raster scan indicated by an arrow 101. Here, each macro block 102 is formed with 16×16 pixels (the number of pixels arrayed laterally×the number of pixels arrayed vertically, which applies to the following description). In the target image 10 shown in FIG. 1, a shaded part represents a region (encoded region) 103 that has already been encoded, and the other part represents a region (uncoded region) 104 that has not been encoded.

Figure 2:
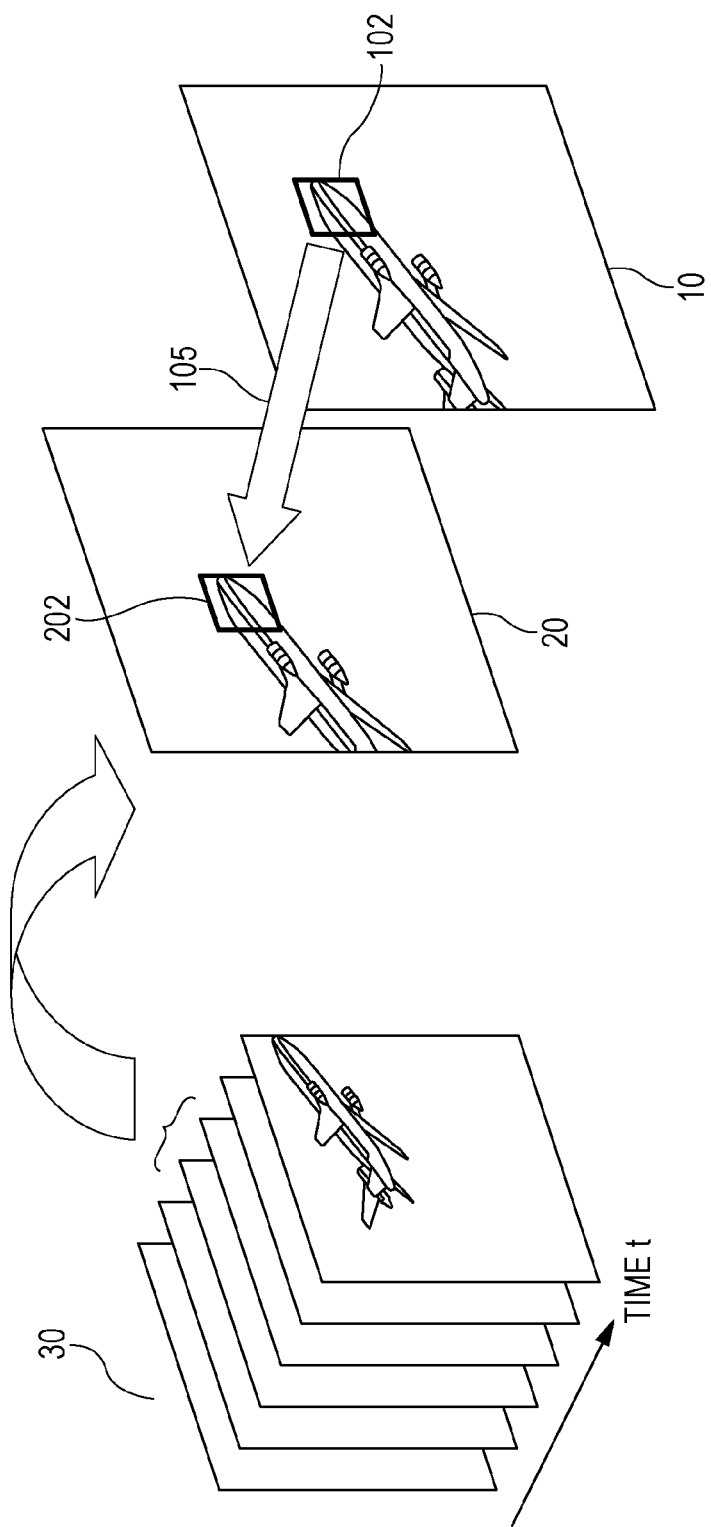
FIG. 2 conceptually shows an inter predicting process with the H.264/AVC.

Prediction schemes are broadly classified into an intra prediction and an inter prediction. FIG. 2 conceptually describes an operation of an inter predicting process with the H.264/AVC. In performing the inter prediction, a decoded image (reference image) 20 is referred to. Here, the decoded image 20 is a distinct encoded image contained in video 30 together with the target image 10. Subsequently, the reference image 20 is searched for a region (reference block) 202 that has a strong correlation with a target block 102, or a predicted target, in the target image 10. In this case, both a predicted difference calculated as an image difference between both the blocks, and a motion vector (MV) 105 that represents a difference in positional coordinates therebetween are encoded.

On the other hand, when a decoding process is performed, the procedure described above may be performed in the reverse order. More specifically a decoded predicted difference is added to the reference block (prediction image) 202 in the reference image 20, so that a decoded image is acquired.

Figure 3:
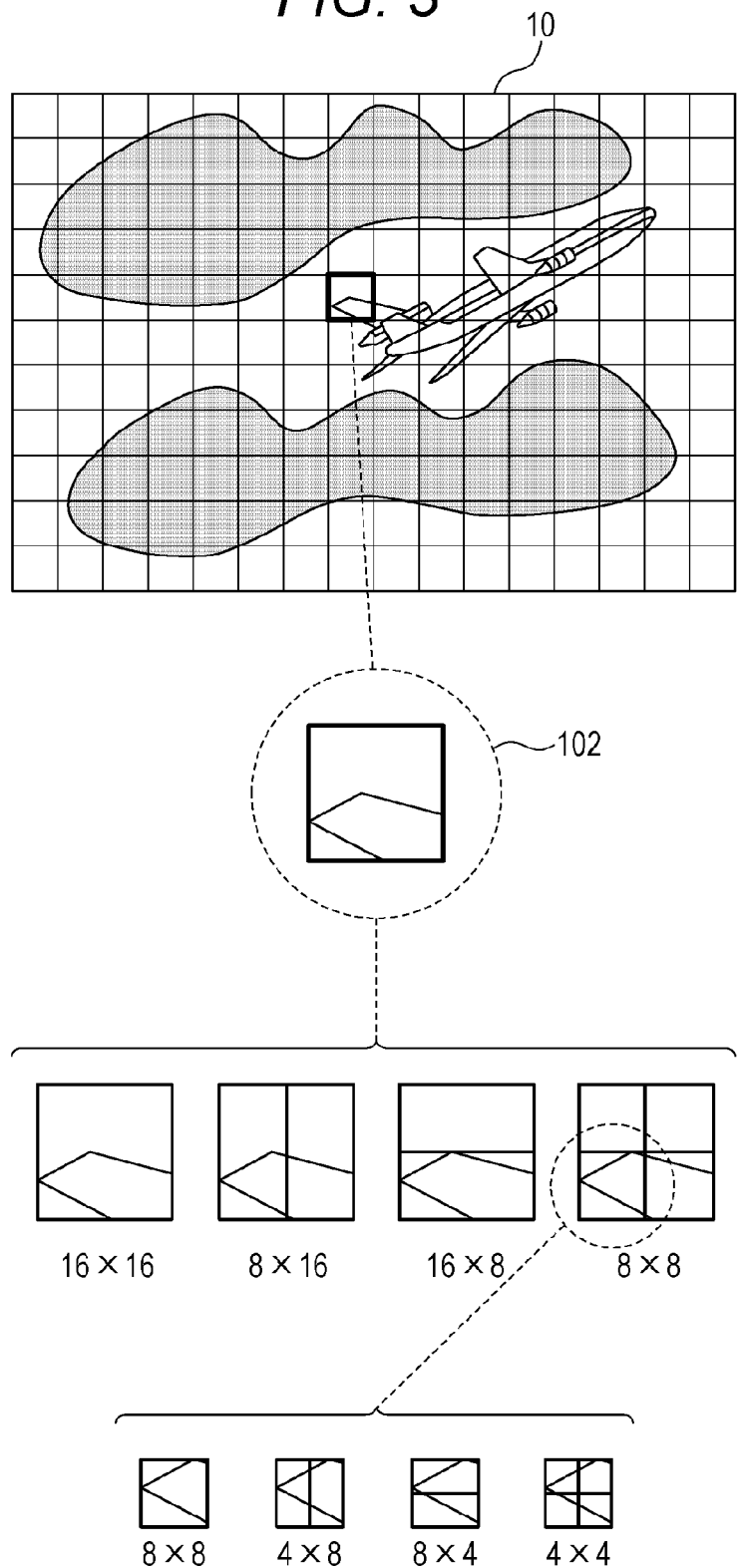
FIG. 3 shows a division pattern for a macro block which is permitted in the inter prediction with the H.264/AVC.

The H.264/AVC makes it possible to further divide each macro block into smaller blocks, and to perform the above inter prediction (motion compensating prediction) in the divided blocks. FIG. 3 shows a division pattern for each macro block 102, which is permitted in performing the inter prediction. Specifically, it is possible to select an optimum one from division patterns defined in advance which ranges from a 4×4 pixel size to a 16×16 pixel size, when the predict is performed in the macro blocks 102 in the target image 10.

Specific examples of the division pattern for each macro block 102 include 16×16, 8×16, 16×8, 8×8, 4×8, 8×4, and 4×4 pixel sizes, as shown in FIG. 3.

Figure 4:
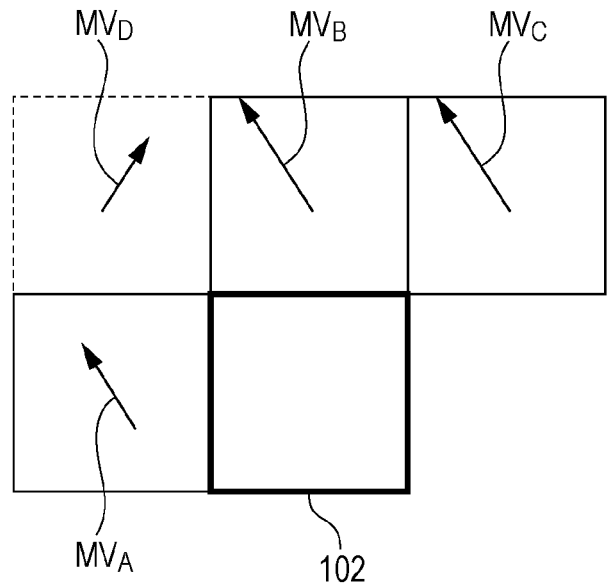
FIG. 4 shows a method of calculating a prediction vector with the H.264/AVC.

FIG. 4 conceptually describes a prediction vector (PMV) required to encode a motion vector. A difference between the motion vector in the target block 102 and a prediction vector is encoded as the motion vector. Here, the prediction vector refers to a median value of motion vectors $MV_A$, $MV_B$, and $MV_C$ for surrounding blocks (the blocks on the left, upper, and upper right sides of the target block) that have undergone an encoding process (however, if the motion vector $MV_C$ cannot be used, a motion vector $MV_D$ for the block in the target block on its upper left may be used instead). The H.264/AVC specification exactly defines the locations of blocks whose motion vectors are referred to, but these locations are dependent on a division pattern for each target block.

Since a difference between a motion vector and a prediction vector is encoded as the motion vector, the amount of generated code to be generated is greatly dependent on the accuracy of the prediction vector. In order to increase the efficiency of the encoding process, therefore, it is necessary to estimate the amount of generated code to be generated by referring to the prediction vector during the motion search or mode selecting process.

Figure 5:
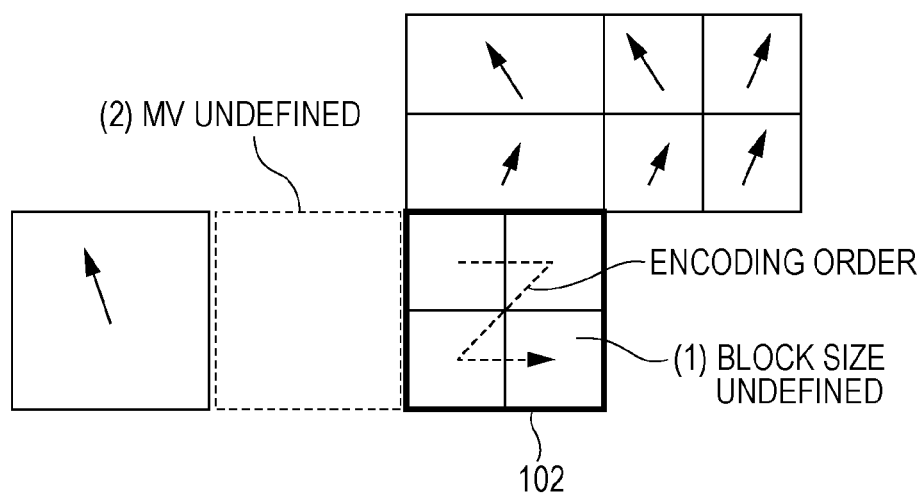
FIG. 5 shows exemplary cases where a prediction vector cannot be calculated accurately.

FIG. 5 shows two exemplary cases where a prediction vector cannot be calculated during the motion search or mode selecting process. The first example will be described below. For example, if an encoder performs a motion search in small blocks and determines a division pattern for a target block on the basis of this search result, the size of the target block 102 may not have been determined when the motion search process is initiated ((1) of FIG. 5).

The second example will be described below. If the encoding process is influenced by pipeline processing, for example, because of an encoder implemented using an LSI, encoding of the surrounding blocks may not be completed in the course of the encoding process. At this time, the motion vectors for the surrounding blocks to be referred to may not have been determined ((2) of FIG. 5).

An image encoding device in this embodiment successfully copes with the two cases where a prediction vector cannot be calculated.

(Configuration of Image Coding Device)

Figure 6:
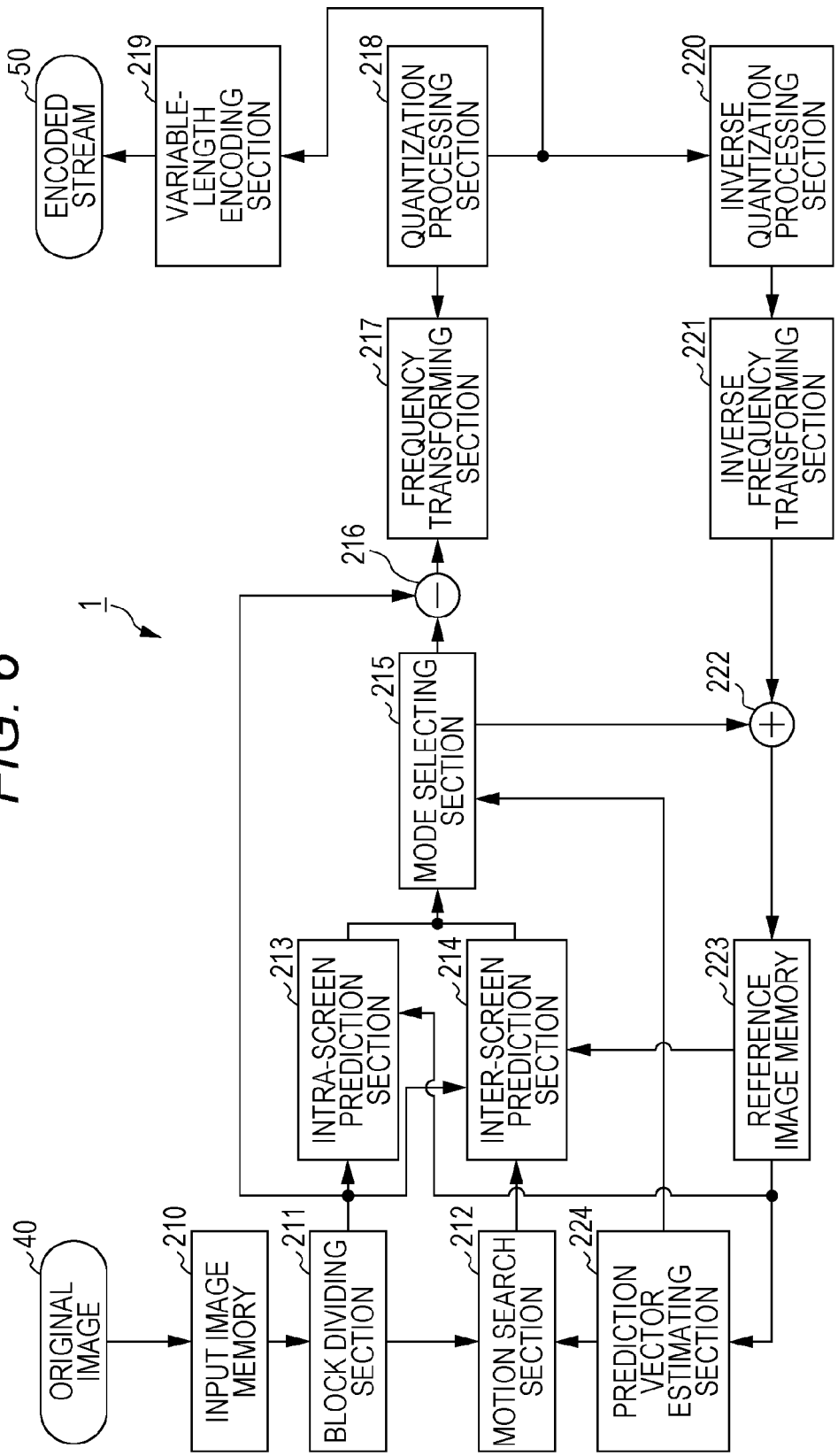
FIG. 6 is a functional block diagram of an image encoding device according to an embodiment of the present invention.

FIG. 6 shows an exemplary configuration of the image encoding device in this embodiment. As shown in FIG. 6, an image encoding device 1 includes an input image memory 210, a block dividing section 211, an intra prediction section 213, a motion search section 212, an inter prediction section 214, a mode selecting section 215, a subtracting section 216, a frequency transforming section 217, a quantization processing section 218, a variable-length encoding section 219, an inverse quantization processing section 220, an inverse frequency transforming section 221, an adding section 222, a reference image memory 223, and a prediction vector estimating section 224.

The input image memory 210 holds input original image 40. The block dividing section 211 divides the original image 40 into multiple small regions having a preset size. The intra prediction section 213 subjects each of the blocks divided by the block dividing section 211 to the inter prediction. The inter prediction section 214 subjects each block to the inter prediction, on the basis of motion amounts (motion vectors) detected by the motion search section 212. The mode selecting section 215 determines a prediction mode (a prediction method and a block size) that matches a property of the image.

The subtracting section 216 generates a predicted difference. Both the frequency transforming section 217 and the quantization processing section 218 encode the generated predicted difference. The variable-length encoding section 219 performs an adaptive encoding process according to the likelihood of codes. Both the inverse quantization processing section 220 and the inverse frequency transforming section 221 decode the predicted difference encoded by both the frequency transforming section 217 and the quantization processing section 218. The adding section 222 generates a decoded image by using the decoded predicted difference. The reference image memory 223 holds the generated decoded image so as to be used for a downstream intra prediction or inter prediction. The prediction vector estimating section 224 estimates a prediction vector.

Among the constituents shown in FIG. 6, the constituents other than the prediction vector estimating section 224 perform processes that are substantially the same as those performed in a conventional intra prediction or inter prediction. Both the motion search section 212 and the mode selecting section 215, however, perform processes in accordance with an output from the prediction vector estimating section 224. Functions of the other constituents are known in the art, and therefore will be briefly described herein.

The input image memory 210 holds one of images contained in the original image 40 as an encoding target image 10. Subsequently, the block dividing section 211 divides the encoding target image 10 into multiple small target blocks, and outputs them to the motion search section 212, the intra prediction section 213, and the inter prediction section 214.

The motion search section 212 calculates motion amounts of the target blocks 102 by using a decoded image (reference image 20) stored in the reference image memory 223, and then outputs the motion vectors to the inter prediction section 214. The intra prediction section 213 and the inter prediction section 214 subject blocks of multiple given sizes to inter predict and inter predicting processes, respectively. The mode selecting section 215 selects an optimum predicting mode by selecting one of the inter and inter predictions.

Following the above, the subtracting section 216 generates a predicted difference by using the optimum prediction encoding means (the intra prediction section 213 or the inter prediction section 214) selected by the mode selecting section 215. Subsequently, the subtracting section 216 gives the predicted difference to the frequency transforming section 217. The frequency transforming section 217 and the quantization processing section 218 subject the received predicted difference in blocks of a designated size to a frequency transformation such as a discrete cosine transform (DCT) and a quantizing process, respectively. Subsequently, the quantization processing section 218 outputs the quantized frequency transformation coefficient to both the variable-length encoding section 219 and the inverse quantization processing section 220. The variable-length encoding section 219 generates an encoded stream 50 by encoding header information such as the quantized transformation coefficient or motion vector, on the basis of the likelihood of codes.

The inverse quantization processing section 220 and the inverse frequency transforming section 221 subject the quantized frequency transformation coefficient to an inverse quantization and an inverse frequency transformation such as an inverse DCT, respectively, thereby acquiring the predicted difference. Subsequently, the inverse frequency transforming section 221 outputs the predicted difference to the adding section 222. Following this, the adding section 222 adds together the prediction image and decoded predicted difference that are output from the mode selecting section 215 and the inverse frequency transforming section 221, respectively, thereby generating a decoded image (reference image 20). The generated decoded image is stored in the reference image memory 223.

When information for calculating a prediction vector in conformity with the H.264/AVC specification cannot be acquired, the prediction vector estimating section 224 calculates the prediction vector by estimating the information above. The motion search section 212 and the mode selecting section 215 estimate the amount of code date, determine a search start point, and make a mode selection, by using the prediction vector estimated by the prediction vector estimating section 224.

The image encoding device 1 described above can be implemented using an image processing LSI as described in "Standard technology (layout of system LSI) database: image processing LSI/data compressing LSI," [online], JPO, [Search date: Oct. 11, 2011], Internet <URL: http://www.jpo.go.jp/shiryou/toushin/chousa/0007.html>. Alternatively, the image encoding device 1 can be implemented using a typical computer equipped with a superscalar or multi-core type of central processing unit (CPU) and a memory such as random access memory (RAM). Specifically, the function of each constituent in the image encoding device 1 can be implemented, for example, by the CPU reading a program from the memory and executing it or by a field programmable gate array calculating gate level logic acquired through an operation or logic synthesis.

A feature of the image encoding device 1 in this embodiment is as follows. When the size of a target block is undefined or when motion vectors for surrounding blocks to be referred to are not determined, as described with reference to FIG. 5, the prediction vector estimating section 224 calculates a prediction vector by predicting information required to calculate this prediction vector. A detailed description will be given below of processing performed by the prediction vector estimating section 224.

(Case Where Size of Target Block is Undefined)

In the case where the size of the target block 102 is undefined as shown in (1) of FIG. 5, the prediction vector estimating section 224 estimates a division pattern for each macro block, and temporarily determines the size of the target block 102, thereby enabling the prediction vector to be calculated.

Figure 7:
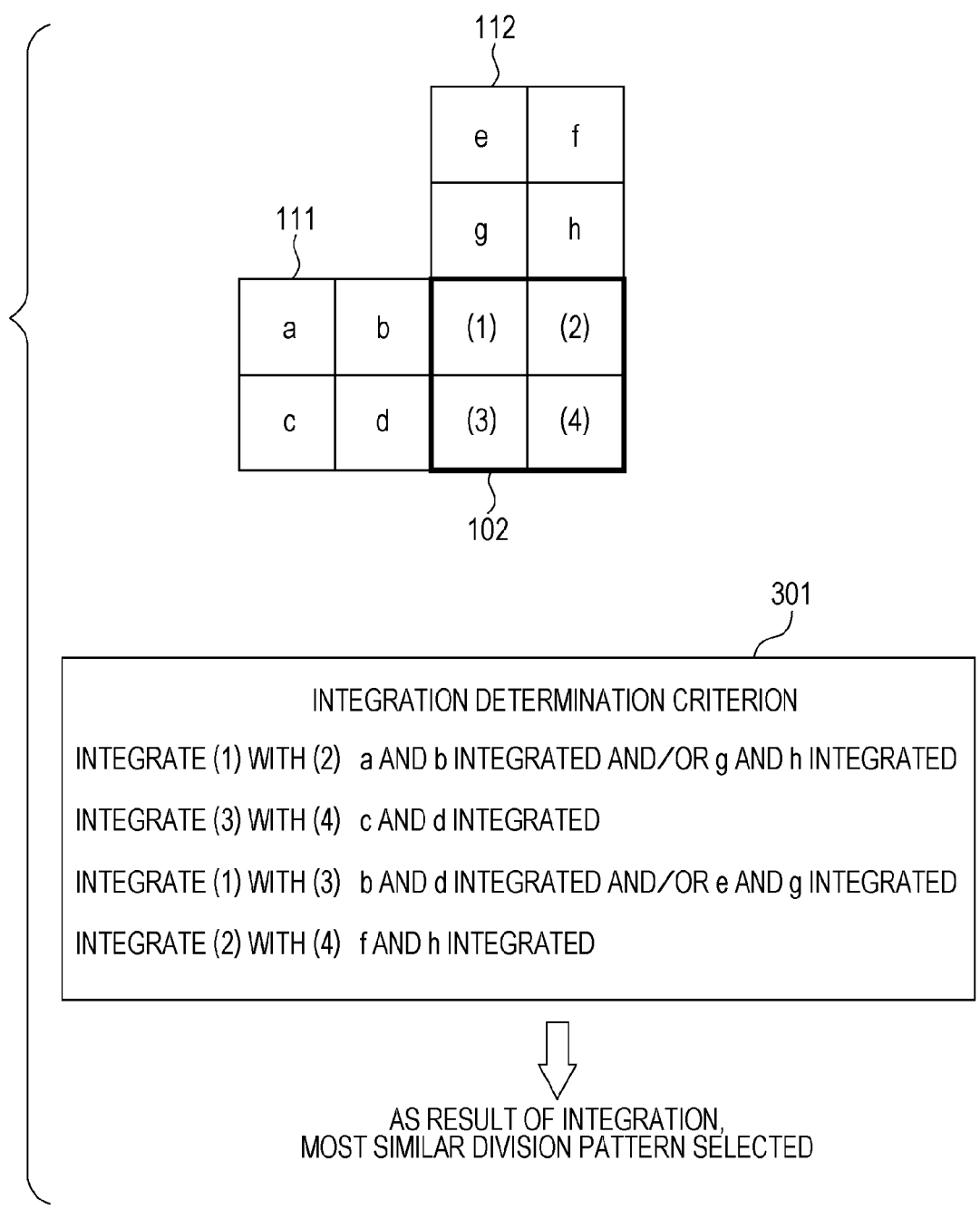
FIG. 7 shows an integration determining process, through which a prediction vector estimating section in the image encoding device according to the embodiment determines whether to integrate small blocks in a target block.

FIG. 7 describes an exemplary procedure (integration determination), through which the prediction vector estimating section 224 determines whether to integrate small blocks in the target block 102 by referring to division patterns in surrounding blocks that have undergone the encoding process. In this case, the prediction vector estimating section 224 repeats the integration determination in accordance with a preset criterion (referred to below as an "integration determination criterion"), thereby estimating a final block division pattern. This drawing shows an exemplary case where a macro block 111 and a macro block 112 adjoining the left and upper sides, respectively, of the target block 102 to be referred to. In this exemplary case, it is assumed that the integration determination is applied to small blocks of an 8×8 size, in order to facilitate the understanding.

If the H.264/AVC specification is employed, each small block may have a 4×4 size. If any specification other than the H.264/AVC specification is employed, namely, if small blocks in this specification which corresponds to the macro blocks do not have a 16×16 size, any size such as a 2×2 or 16×16 size may be used.

In this exemplary case, when a determination whether to integrate two upper small blocks (1) and (2) in the target block 102 is made, it is necessary to check whether or not a pair of upper small blocks a and b in the macro block 111 which adjoin the left side of the target block 102 are integrated with each other and whether or not a pair of lower small blocks g and h in the macro block 112 which adjoin the upper side of the target block 102 are integrated with each other. Alternatively, in another determination criterion, if at least one of these pairs are integrated with each other, the small block (1) and (2) may be determined to be integrated with each other.

Furthermore, as for the integration of small blocks (3) and (4), if two upper small blocks c and d in the macro block 111 which adjoin the left side of the target block 102 are integrated with each other, the small blocks (3) and (4) are determined to be integrated with each other.

Likewise, when a determination whether to integrate the two left small blocks (1) and (3) in the target block 102 is made, it is necessary to check whether or not a pair of right small blocks b and d in the left-adjacent macro block 111 are integrated with each other and whether or not a pair of lower small blocks e and g in the upper-adjacent macro block 112 are integrated with each other. Alternatively, in another determination criterion, if at least one of these pairs is integrated with each other, the small blocks (1) and (3) may be determined to be integrated with each other.

Furthermore, as for the integration of the small blocks (2) and (4), if two upper small blocks f and h in the macro block 112 which adjoin the upper side of the target block 102 are integrated with each other, the small blocks (2) and (4) are determined to be integrated with each other.

When the above rule is generalized, it can be described as follows. Suppose a determination is made whether to integrate a pair of small blocks N and M in the target block 102 which adjoin each other in an assumed division pattern. In a surrounding macro block whose division pattern has already been determined, from small blocks into which the surrounding macro block is divided in accordance with the same assumed division pattern, a pair of small blocks which are arrayed in the same direction as the small blocks N and M and adjoin the small blocks N and M are found. Subsequently, the integration state of the pair of small blocks found (they are actually composed of a single small block or different small blocks) is applied to that of the small blocks N and M. If two pairs of adjacent small blocks are present, AND or Boolean ADD of the integration states of these pairs is used. One of the two pairs of adjacent small blocks is arrayed along an extension of the array of the small blocks N and M.

Figure 8:
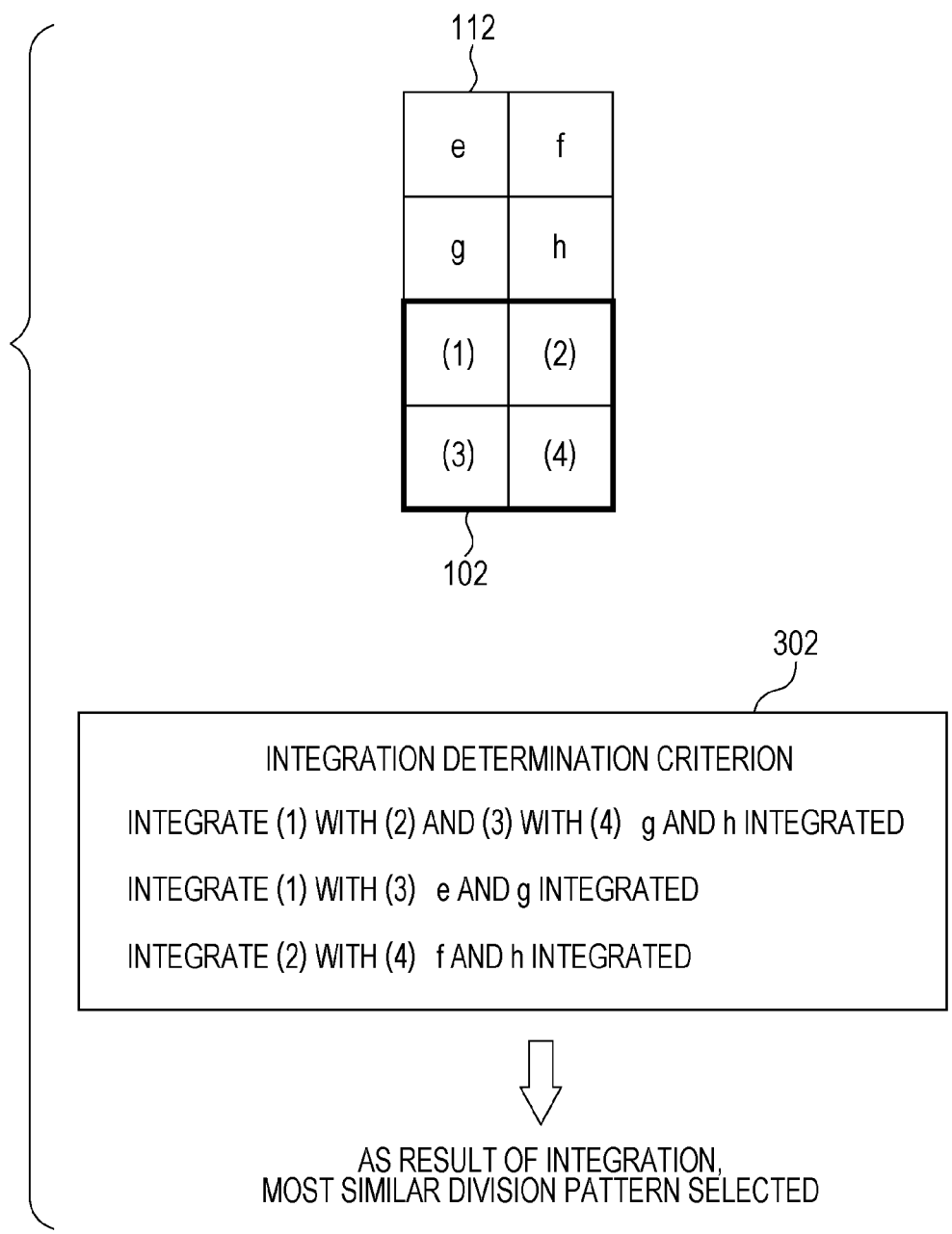
FIG. 8 shows an integration determining process, through which the prediction vector estimating section in the image encoding device according to the embodiment determines whether to integrate small blocks in a target block.

FIG. 8 describes an exemplary procedure through which the prediction vector estimating section 224 makes an integration determination by referring to only the macro block 112 adjoining the upper side of the target block 102, if the macro block 111 adjoining the left side of the target block 102 cannot be used, for example, because of incomplete encoding of the macro block 111.

According to an integration determination criterion 302 in FIG. 8, when the small blocks g and h are integrated with each other, it is determined that the small blocks (1) and (2) in the target block 102 are integrated with each other and the small blocks (3) and (4) are also integrated with each other. When small blocks e and g are integrated, the small blocks (1) and (3) in the target block 102 are determined to be integrated with each other. When the small blocks f and h are integrated with each other, the small blocks (2) and (4) in the target block 102 are determined to be integrated with each other.

Note that FIGS. 7 and 8 are merely examples; the integration determination criteria 301 and 302 may employ any procedure that refers to a surrounding block, and a macro block which is referred to is not limited to that positioned adjacent to the upper or left side of a target block.

Figure 9:
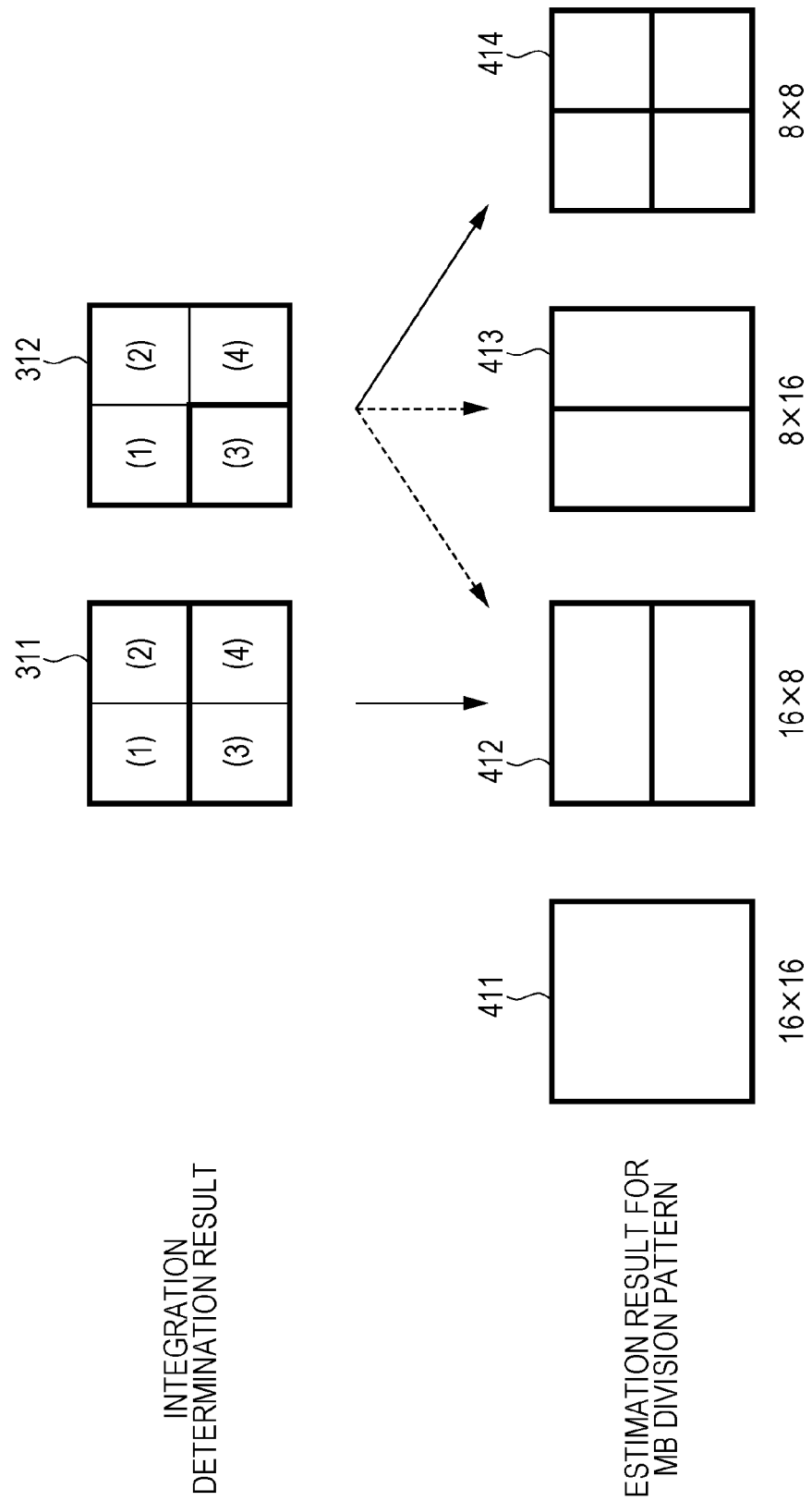
FIG. 9 shows a method in which the prediction vector estimating section in the image encoding device according to the embodiment estimates a macro block separation pattern, on the basis of the integration determination result.

FIG. 9 shows an exemplary method of estimating a division pattern for each macro block (MB), on the basis of a result of an integration determination. When an integration determination is made with a small block of an 8×8 size, the division patterns for the macro block have four types; 16×16 (block 411), 16×8 (block 412), 8×16 (block 413), and 8×8 (block 414), as shown in FIG. 9.

For example, when the upper small blocks (1) and (2) are integrated with each other and the lower small blocks (3) and (4) are also integrated with each other (target block 311) as a result of the integration determination, the 16×8 division pattern (block 412) is selected, because this division pattern is the most similar pattern.

However, for example, when the two upper small blocks (1) and (2) in the target block are integrated with each other and the two right small blocks (2) and (4) are also integrated with each other (target block 312), 16×8, 8×16 and 8×8 division patterns (blocks 412, 413 and 414, respectively) are present as the most similar division patterns. In this case, the division pattern is determined to be one of them, for example, by referring to another encoding parameter such as a bit rate, a quantizing parameter, or the motion vectors for surrounding blocks. For example, when a high bit rate is employed, it is effective in selecting a division pattern having a small block size (e.g., 8×8 division pattern (block 414)).

The prediction vector estimating section 224 determines the block size of the target block 102, for example, in a manner as described in FIGS. 7 to 9, and then calculates the prediction vector by using the determined block size.

(Case Where Motion Vector for Surrounding Block to be Referred to is Not Determined)

A description will be given of a method of calculating a prediction vector in the case where a motion vector for a surrounding block to be referred to is not determined, as in (2) of FIG. 5. The H.264/AVC standard specification defines which surrounding block is referred to when a prediction vector is calculated. As described above, however, there are cases where information regarding the motion vector for this surrounding block cannot be acquired, because an encoding process therefor has not been completed.

In this exemplary case, the prediction vector estimating section 224 refers to a plurality of motion vectors for surrounding blocks around the target block which can be referred to, and calculates a variance value of them. Subsequently, the prediction vector estimating section 224 determines, on the basis of this variance value, a block to be referred to (referred to below as an "alternative block") instead of the surrounding block (referred to below as an "unreferable block") whose motion vector information cannot be acquired. Subsequently, the prediction vector estimating section 224 calculates the prediction vector by using the motion vector information on the alternative block.

In general, when a variance value of motion vectors becomes low, there is a high probability that a large object is present (described) close to the target object, and that even a block which is a long distance away from the unreferable block has a strong correlation with this unreferable block. Conversely, when the above variance value becomes high, there is a high probability that a small object is present (described) close to the target object, and that a block which is a long distance away from the unreferable block is considered to have a weak correlation with this unreferable block.

Therefore, when the above variance value is low, a block that is some distance away from the target block but disposed in a direction which is close to that of the unreferable block, as viewed from the target block is used as an alternative block. On the other hand, when the above variance value is high, a block that is a short distance away from the target block is used as an alternative block. The prediction vector estimating section 224 thereby estimates the prediction vector.

Figure 10:
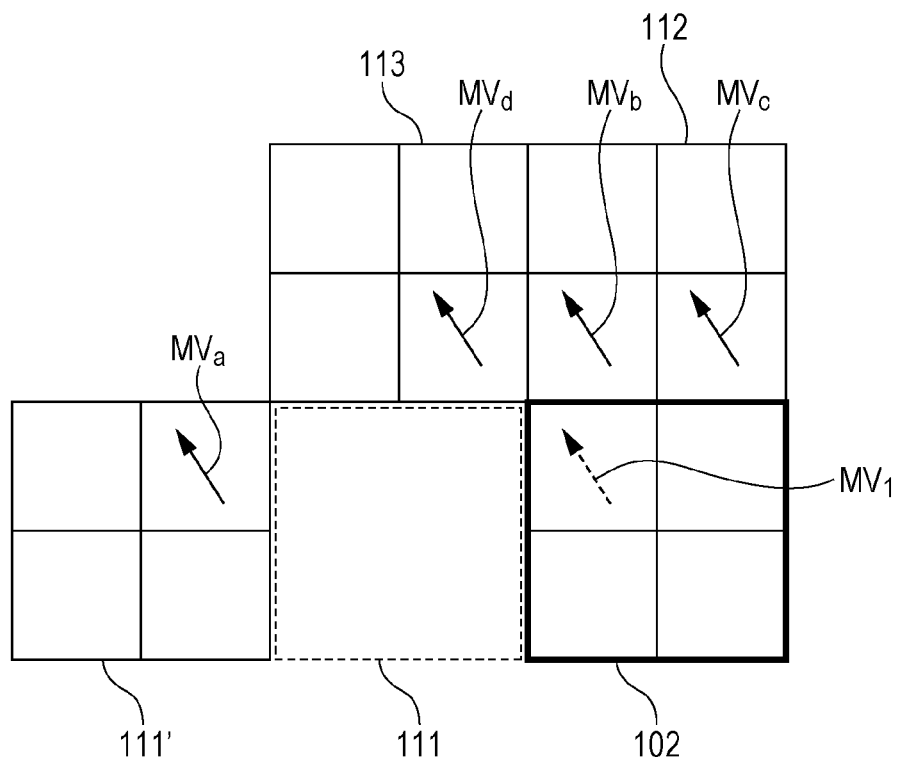
FIG. 10 shows a method in which the prediction vector estimating section in the image encoding device according to the embodiment calculates prediction vectors, in order to encode an encoding motion vector for an 8×8 block positioned in a target block at its upper left.

FIG. 10 shows an exemplary method of calculating a prediction vector $PMV_{MV1}$ used to encode a motion vector $MV_1$ for an 8×8 block positioned in the target block 102 at its upper left, in the case where a motion vector for a left-adjacent block 111 is undefined. In this exemplary case, the left-adjacent block 111 should be referred to, but cannot be done. Therefore, out of blocks in a macro block 111' shifted to the left side by another one block and positioned in the same direction as that of the unreferable block, a block (upper right block) that has the shortest distance from the target block whose PMV is to be calculated is used. Subsequently, a motion vector $MV_a$ therefor is referred to.

Specifically, a variance value $ACT_{MV}$ of the motion vector $MV_a$ for the macro block 111', the motion vector $MV_c$ for the block 112 adjoining the upper side of the target block 102, and a motion vector $MV_d$ for the block 113 adjoining the left side of the target block 102 is calculated. If the variance value $ACT_{MV}$ is less than a threshold ((1) of FIG. 10), the motion vector $MV_a$ for the block disposed in the same direction as that of the left-adjacent reference block is used to estimate a prediction vector $PMV_{MV1}$.

If the variance value $ACT_{MV}$ is equal to or more than the threshold ((2) of FIG. 10), the motion vector $MV_d$ for the block (upper-left adjacent block 113 in this exemplary case) having a short distance from the target block 102 is used to estimate the prediction vector $PMV_{MV1}$. Note that FIG. 10 is merely an example; a location of an alternative block used instead of an unreferable block that has not undergone the encoding process, and a method of calculating a variance value are not limited to this exemplary case.

The threshold to be compared with the variance value $ACT_{MV}$ may be set as a fixed value in advance, or determined adaptively depending on a quantizing parameter, a distance between a target block and an alternative block, or the like. More specifically, for example, when the quantizing parameter is set to a high value, the threshold may be set to a low value. This enables the prediction vector to be calculated accurately.

Moreover, a method of calculating the prediction vector $PMV_{MV1}$ may be changed depending on its application, such as that in which the prediction vector $PMV_{MV1}$ is used to determine a search start point in a motion search process or to estimate the amount of generated code in a motion search process, a mode selecting process or the like. For example, a prediction vector to be used to estimate the amount of generated code may be calculated with the method in this embodiment, and a prediction vector to be used to determine a search start point in a motion search process may be the motion vector of a block having the shortest distance. This enables the prediction vector to be calculated efficiently.

(Flowchart of Process for Estimating Prediction Vector)

Figure 11:
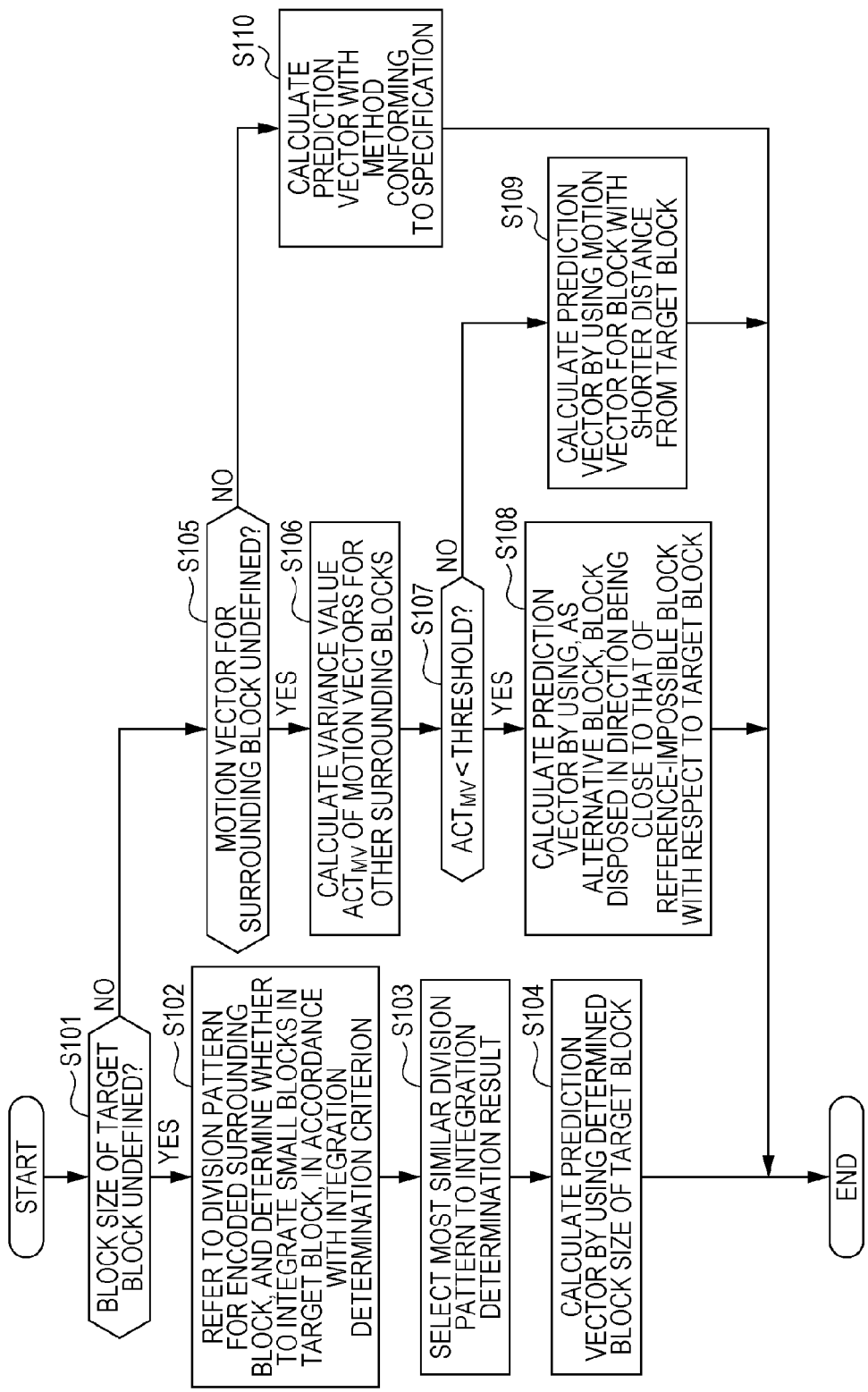
FIG. 11 is a flowchart showing a process procedure performed by the prediction vector estimating section in the image encoding device according to the embodiment.

FIG. 11 is a flowchart indicating a flow of an exemplary process for estimating a prediction vector which is performed the prediction vector estimating section 224 in the image encoding device 1 in this embodiment.

If the block size of the target block 102 is undefined (Step S101: Yes), the prediction vector estimating section 224 refers to the division pattern for a surrounding block (e.g., the blocks 111 and 112 in FIG. 7, the block 112 in FIG. 8, etc.) that has undergone an encoding process. Subsequently, the prediction vector estimating section 224 determines whether to integrate small blocks in the target block, in accordance with an integration determination criterion (e.g., the integration determination criterion 301 in FIG. 7, the integration determination criterion 302 in FIG. 8, etc.) (Step S102).

The prediction vector estimating section 224 selects a division pattern that is the most similar to the integration determination result at Step S102 (Step S103). Subsequently, the prediction vector estimating section 224 calculates the prediction vector by using the block size of the target block which is determined by the division pattern selected at Step S103 (Step S104), and terminates this processing.

If the block size of the target block 102 is defined at Step S101 (Step S101: No) but the motion vector for the surrounding block (e.g., the block 111 in FIG. 10) around the target block 102 is undefined (Step S105: Yes), the prediction vector estimating section 224 calculates the variance value $ACT_{MV}$ of the motion vectors (e.g., the motion vectors $MV_a$, $MV_b$ and $MV_c$ in FIG. 10) for other surrounding blocks (Step S106).

If the variance value $ACT_{MV}$ calculated at Step S106 is less than a preset threshold (Step S107: Yes), the prediction vector estimating section 224 calculates the prediction vector by using, as an alternative block, a block (e.g., the block 111' in FIG. 10) disposed in a direction that is close to that of the unreferable block (e.g., the block 111 in FIG. 10) as viewed from the target block 102 (Step S108).

If the variance value $ACT_{MV}$ calculated at Step S106 is equal to or more than the preset threshold (Step S107: No), the prediction vector estimating section 224 calculates the prediction vector by using the motion vector for a block that has a short distance from the target block 102 (e.g., $MV_d$ in the block 111 in FIG. 10) (Step S109).

If the motion vector for the surrounding block around the target block 102 is defined at Step S105 (Step S105: No), the prediction vector estimating section 224 calculates the prediction vector with a method conforming to a specification (Step S110).

The above-described process for estimating a prediction vector is merely an example; processing performed by the prediction vector estimating section 224 is not limited to this example (modification).

In this embodiment, the prediction and the frequency transformation are performed in blocks; alternately they may be calculated, for example, in objects extracted from the background of an image. Furthermore, the DCT exemplifies the frequency transform in this embodiment; however any orthogonal transform used to remove an inter-pixel correlation, such as the Discrete Sine Transformation (DST), Wavelet Transformation (WT), Discrete Fourier Transformation (DFT), or Karhunen-Loeve Transformation (KLT), may be employed. In addition, for example, the inter prediction does not necessarily have to be performed. Alternatively, a frequency transform may be directly applied to an original image, like the intra-encoding technique in the MPEG-1 or MPEG-2. Also, the variable-length encoding does not necessarily have to be performed.

The scope of the present invention is not limited to the exemplary embodiment illustrated and described herein; all embodiments which produce effects that are equivalent to those at which the present invention aims are included in this scope. Moreover, the scope of the present invention can be defined by a specific one or desired combination of all the individual disclosed features.

(Supplementary Notes)

As can be seen from the above detailed description regarding the embodiment of the present invention, a part or the whole of the embodiment described above may also be described as in supplementary notes described below. The following supplementary notes are, however, examples of the present invention, and therefore the present invention is not limited to their cases.

(Supplementary Note 1)

The image encoding device according to one of supplementary notes 1 to 3, wherein the motion search section determines a motion search start point, on the basis of the prediction vector calculated by the prediction vector estimating section.

(Supplementary Note 2)

The image encoding device according to one of supplementary notes 1 to 4, further including a mode selecting section that selects an encoding mode from a plurality of encoding modes, wherein the mode selecting section calculates the amount of generated code to be generated, from the prediction vector calculated by the prediction vector estimating section, and selects the encoding mode, on the basis of the calculated amount of generated code to be generated.

(Supplementary Note 3)

An image encoding device according to an aspect of the present invention which searches for a motion vector for each of blocks into which an encoding target macro block in a target image to be encoded is divided in accordance with any of predetermined division patterns, and which encodes an image by subjecting the target macro block to an inter prediction, on the basis of the motion vector, the image encoding device including:

a motion search section determining a search start point of the motion vector for each block, from a prediction vector, the prediction vector being a motion vector determined with motion vectors for surrounding blocks adjoining each block and in accordance with a preset rule, the motion search section starting searching for a motion vector for the encoding target region from the search start point;

a prediction vector estimating section, when a division pattern for the encoding target macro block having each block is undefined in calculating the prediction vector in accordance with the preset rule, calculating the prediction vector by temporarily determining a division pattern for the encoding target region, from a division pattern for an encoded macro block in the target image other than the encoding target macro block, and when at least one of the motion vectors for the surrounding blocks cannot be acquired, calculating the prediction vector by substituting a motion vector for a block in the target image other than the encoding target macro block; and a variable-length encoding section encoding a difference between the prediction vector and the motion vector for the encoding target region that the motion search section has searched for, wherein the temporary determination includes a determination whether to integrate each of pairs of blocks that has adjacent relationship when the target macro block is divided in accordance with the predetermined division pattern, a division pattern that is the same as or the most similar to a division pattern resulting from a combination of the determinations is determined from acceptable division patterns, and each of the determinations is made such that each pair of blocks have the same integration state as a pair of blocks out of blocks into which a surround macro block whose division pattern has been determined is divided in accordance with the predetermined division pattern, the pair of blocks including blocks arrayed in the same direction as each pair of blocks and adjoining each pair of blocks, and wherein when at least one of the motion vectors for the surrounding blocks cannot be acquired, the prediction vector estimating section determines the substitute motion vector, from a plurality of candidates, on the basis of a result of a comparison between a threshold and a variance value of respective motion vectors for at least three blocks included in a plurality of encoded macro blocks in the target image other than the encoding target macro block.

The variance value is derived from motion vectors in the same quantity as those used to calculate the prediction vector when all the motion vectors can be acquired, the motion vectors in the same quantity include the replaced motion vector, as one of the plurality of candidates, and when the variance value derived from motion vectors for certain blocks in the same quantity is less than a threshold, the prediction vector estimating section calculates the prediction vector by using the blocks in the same quantity, from which the variance value has been derived.

Although the present invention is suitable for the H.264/AV but not limited thereto, and is applicable to video compression utilizing prediction encoding, such as the H.262/MPEG-2, MPEG-4, H.263, or H.265/HEVC.

What is claimed is:

1. A method implemented by a computing device having a multi-core processor performing operations comprising:
   determining a start point for searching a motion vector for an encoding target region from a prediction vector as the motion vector determined in accordance with a preset rule, the prediction vector being the motion vector for the encoding target region to be predicted, the preset rule being defined in advance with a plurality of motion vectors for a plurality of surrounding blocks positioned around the encoding target region;
   searching for the motion vector for the encoding target region from the start point;
   determining a size of the encoding target region from a size of an encoded region in the target image other than the encoding target region when the size of the encoding target region cannot be acquired in calculating the prediction vector in accordance with the preset rule, thereby calculating the prediction vector;
   calculating the prediction vector from the motion vector for an encoded block in the target image other than the encoding target region when at least one of the plurality of motion vectors for the plurality of surrounding blocks cannot be acquired; and
   encoding a difference between the prediction vector and the motion vector for the encoding target region which has been searched for.

2. The method of claim 1, further comprising:
   determining a block size of the encoding target region in reference to a division pattern of a macroblock next to another macroblock containing the encoding target region in accordance with a rule defined in advance when the size of the encoding target region cannot be acquired,
   wherein the encoded block is chosen from a block positioned in a same direction as a surrounding block of the plurality of surrounding blocks where the motion vector cannot be acquired.

3. The method of claim 1, further comprising:
   determining which motion vector of the plurality of motion vectors for a plurality of encoded regions in the target image other than the encoding target region is used to calculate the prediction vector on a basis of a variance value of the plurality of motion vectors for the plurality of encoded regions when at least one of the plurality of motion vectors for the plurality of surrounding blocks cannot be acquired.

4. The method of claim 1, further comprising determining a motion start point on a basis of the prediction vector.

5. The method of claim 1, further comprising:
   selecting an encoding mode from a plurality of encoding modes;
   calculating an amount of generated code to be generated from the prediction vector; and
   selecting the encoding mode on a basis of the calculated amount of generated code to be generated.

6. A method implemented by a computing device having a pipelined processor performing operations comprising:
   determining a search start point of a motion vector for each block from a prediction vector, the prediction vector being a motion vector determined with a plurality of motion vectors for a plurality of surrounding blocks adjoining each block and in accordance with a preset rule,
   searching for the motion vector for an encoding target region from the search start point;
   calculating the prediction vector by temporarily determining a division pattern for the encoding target region from a division pattern for an encoded macroblock in a target image other than an encoding target macroblock when a division pattern for the encoding target macroblock having each block undefined in calculating the prediction vector in accordance with the preset rule;
   calculating the prediction vector by substituting a motion vector for a block in the target image other than the encoding target macroblock when at least one of the plurality of motion vectors for the plurality of surrounding blocks cannot be acquired;
   encoding a difference between the prediction vector and the motion vector for the encoding target region that has been searched for,
      wherein a temporary determination includes a determination whether to integrate each pair of blocks that has an adjacent relationship when the target macroblock is divided in accordance with a predetermined division pattern, a division pattern that is same as or most similar to a division pattern resulting from a combination of a plurality of determinations is determined from a plurality of acceptable division patterns, and each of the plurality of determinations is made such that each pair of blocks have a same integration state as a pair of blocks out of a plurality of blocks into which a surround macroblock whose division pattern has been determined is divided in accordance with the predetermined division pattern, the pair of blocks including the plurality of blocks arrayed in a same direction as each pair of blocks and adjoining the each pair of blocks; and
   determining a substitute motion vector, from a plurality of candidates, on a basis of a result of a comparison between a threshold and a variance value of a plurality of respective motion vectors for at least three blocks included in a plurality of encoded macroblocks in the target image other than the encoding target macroblock when at least one of the plurality of motion vectors for the plurality of surrounding blocks cannot be acquired.

7. The method of claim 6, further comprising:
calculating the prediction vector by using the plurality of blocks in a same quantity, from which the variance value has been derived when the variance value derived from the plurality of motion vectors for certain blocks in the same quantity is less than a threshold,
wherein the variance value is derived from the plurality of motion vectors in a same quantity as those used to calculate the prediction vector when all of the plurality of motion vectors can be acquired, the plurality of motion vectors in the same quantity include a replaced motion vector, as one of the plurality of candidates.

* * * * *